United States Patent [19]
Hayhurst et al.

[11] Patent Number: 6,007,717
[45] Date of Patent: Dec. 28, 1999

[54] FILTER CLOTHS INCORPORATING A FEED PASSAGE CONNECTOR FOR USE WITH PLATE-TYPE FILTER PRESSES

[75] Inventors: Peter Hayhurst, Lancashire; Peter Lofts, North Yorkshire, both of United Kingdom

[73] Assignee: Scapa Group PLC, Blackburn, United Kingdom

[21] Appl. No.: 08/605,175
[22] PCT Filed: Sep. 14, 1994
[86] PCT No.: PCT/GB94/02002
 § 371 Date: Aug. 25, 1997
 § 102(e) Date: Aug. 25, 1997
[87] PCT Pub. No.: WO95/07743
 PCT Pub. Date: Mar. 23, 1995

[30] Foreign Application Priority Data

Sep. 14, 1993 [GB] United Kingdom .................... 9319008
Feb. 17, 1994 [GB] United Kingdom .................... 9403066

[51] Int. Cl.⁶ .................................................. B01D 25/176
[52] U.S. Cl. ........................................... 210/230; 210/499
[58] Field of Search ........................... 210/224, 227–231, 210/499

[56] References Cited

U.S. PATENT DOCUMENTS 4,931,178 6/1990 Manniso et al. ........................ 210/231

FOREIGN PATENT DOCUMENTS

| 1593016 | 7/1970 | France . |
| 2475415 | 8/1981 | France .................................... 210/231 |
| 68577 | 8/1892 | Germany . |
| 1960820 | 6/1971 | Germany . |
| 2110860 | 9/1972 | Germany . |
| 1459099 | 12/1976 | United Kingdom . |
| 2088231 | 6/1980 | United Kingdom . |

*Primary Examiner*—Matthew O. Savage
*Attorney, Agent, or Firm*—Jacobson, Price, Holman & Stern, PLLC

[57] ABSTRACT

A pair of filter cloths including a feed passage connector for a plate-type filter press is disclosed herein. The filter cloths include first and second tubular members each having opposed first and second free ends and through bores extending continuously from the first free end to the second free end of each of the first and second members. The first free end of the first member is connected to the first filter cloth with the respective cylindrical bore in coaxial alignment with the first feed opening and the second free end of the second member is connected to the second filter cloth. A third tubular member is provided having opposed third and fourth free ends and a radially outer surface and a central bore defining a feed passage. The radially outer surface of the third member is snugly received coaxially within the through bores of the first and second members to sealingly interconnect the first member to the second member.

4 Claims, 3 Drawing Sheets

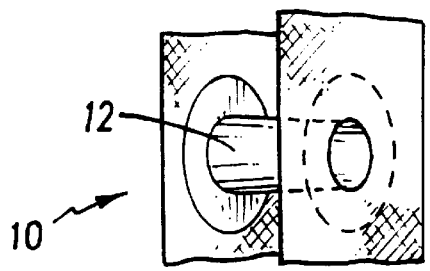
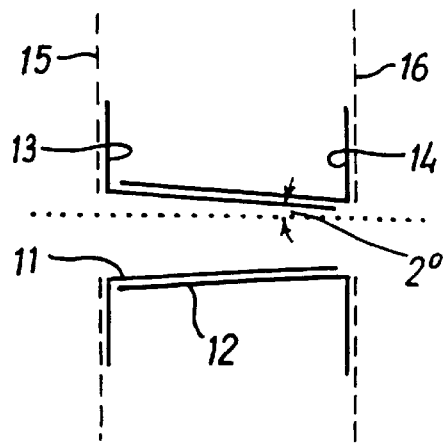
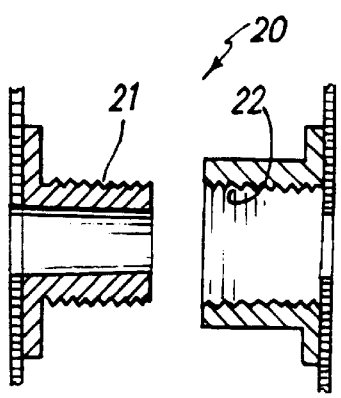
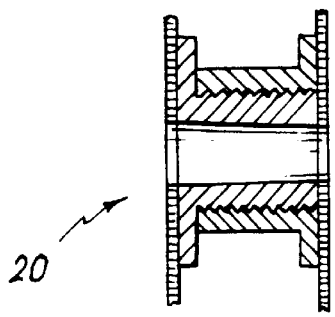
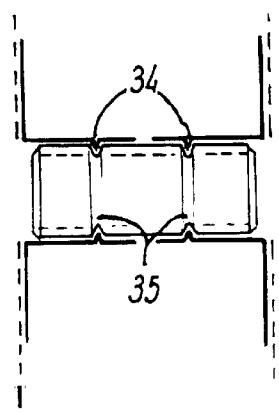

FILTER CLOTHS INCORPORATING A FEED PASSAGE CONNECTOR FOR USE WITH PLATE-TYPE FILTER PRESSES

The present invention relates to a filter fabric apparatus for a filter press and has more particular reference to a barrel neck connection for or between spaced filter cloths in producing a filter fabric for a filter press.

It is known to provide on filter presses and some other filter types filter plates having a slurry feed hole in the filtering area. Both sides of such a filter plate are covered with a layer of filter material and each layer is provided with a feed hole. It is necessary to prevent the slurry from escaping between the filter layers and the filter plate in the region of the feed hole.

In one known arrangement a connecting device consisting essentially of a short cylinder having a flange at one end and threaded at the other is passed through the feed hole of one layer, through the hole in the filter plate and through the hole in the other layer. An annular ring is placed over the projecting cylindrical portion and a nut is screwed onto the threaded portion so pressing the layers of filter material between the flanges and the filter plate to provide a seal. This type of fixing is difficult and time consuming to assemble and often difficult to dismantle when the filter fabric has reached the end of its useful life.

In another known arrangement the two layers of filter material are interconnected at the feed hole by a cylindrical portion made from the filter cloth material which portion is stitched at one end to one layer and at the other end to the other layer to form a so called "barrel neck" filter cloth. The stitching operation is particularly time consuming and installing the filter cloth necessitates passing one layer of the cloth through the feed hole in the filter plate. Furthermore if the filter cloth becomes hardened during use it is often impossible to remove the cloth without cutting. Thus removal for washing is prevented and the useful life of the filter cloth is reduced. Also if one side of the cloth becomes damaged the complete filter cloth must be disregarded.

In order to overcome the problem of stitching a known filter cloth (described in GB Patent Specification No. 1459099) of the "barrel neck" type utilises a hollow plastics cylinder which is secured to the two layers of the filter cloth by heat bonding. However, the problems of fitting and removing the cloth still remain.

In another known arrangement described in German Published Patent Specification No. 2110860 a pair of filter cloths which cover the respective sides of a filter plate are each provided with a connecting device which is semi-circular in cross-section and which is made from an elastic deformable material. The device is secured to the filter cloth and when installed in the press the semi-circular portions of each device lay tightly over one another.

In practice the connections of this type have been found to be difficult to install because the semi-circular section must be deformed substantially. In addition some support is required for the connection to ensure adequate sealing between the two components.

GB 2088231 describes a filter arrangement comprising two filter cloths on opposite sides of a filter press connected by a barrel neck connection. The barrel neck connection comprises two annular members each of which is secured to one of the filter cloths. The ends of the annular members are constructed to connect releasably together with a snap fit. However, such an arrangement is difficult to manufacture in a cost effective manner in that the rings must be made to a close tolerance if they are to fit together correctly. Further- more if the rings are manufactured to such a close tolerance they are difficult to prise apart and are often damaged in doing so. Hence, they cannot be reused.

The present invention has been made from a consideration of these problems.

According to the present invention there is provided a filter fabric apparatus for a filter press comprising first and second filter cloths, each having a feed opening therein and a feed passage between the feed openings, the apparatus comprising at least first and second members and optionally a third member, each of the members having an aperture therein, the first member being secured to the first filter cloth and the second member being secured to the second filter cloth, wherein the feed passage is formed by locating the bulk of the part of the first member operative to form part of the feed passage over at least one of said second and third members such that the bulk of the first member does not define the surface of the feed passage that defines the passage through which material to be filtered is directed, characterised in that at least two of the members comprise materials of differing hardness.

The filter members of the present invention can be mounted on a filter plate individually and then joined together. Likewise they can be removed individually. This facilitates ease of manufacture and easier dismantling of the pair of filter cloths. Furthermore this arrangement enables the cloths to be replaced individually. Cloths permanently joined at their necks would need to be replaced as a pair.

By locating the first member over another member the feed passage is preferably, at least in part, multi-walled. The apertures through the members are preferably concentrically arranged. The two members may be tubular or may comprise truncated cones. A flange may be provided at one end of each of the tubular members or truncated cones. The angle of taper of such truncated cones would preferably be less than 5° and would preferably be substantially 2°. The engaging surfaces of the two cones may be textured, but smooth high friction surfaces are preferred. A lubricant may be provided between the engaging surfaces of the members. This may comprise a fluid such as an aqueous gel, an aqueous syrup or a water insoluble grease based for example on a petroleum product or silicone.

In a further embodiment of the invention the engaging surfaces of the tubular members may comprise co-operating threads. The term "threads" used herein also incorporates regions defining grooves. The threads may be spiral or may be arranged as a series of threads disposed in a parallel fashion. Preferably the apparatus comprises non-continuous co-operating threads in which selected regions of the surface of the tubular members are thread free. These threads may be annular rather than helical. The threads are not introduced to each other by a screwing action, but are connected by a pushing action and an optional subsequent turning action. That is, the threaded regions can be opposed to each other so as to define barbs in which case the two tubular members can be connected via a straight push-fit, or threads on the male member can be aligned with non-threads on the female, followed by a twist to mesh the threads. If the female member is to be twisted the filter cloth attached to the female member should be furled. In dismantling non-alignment of threads is obligatory.

If non-threaded and threaded regions are provided the threaded regions are preferably equally spaced around the tubular member. The non-threaded regions are similarly spaced and are at least as large as the threaded regions so as to facilitate separation of the two tubular members.

The arrangement described above is relatively easy to manufacture. It is also easy to assemble and disassemble in situ and results in guaranteed alignment on the plate.

The two tubular members may be connected via barbs on one member engageable with stops on another. One of the barbs or stops are ideally located on the outer surface of the innermost member, the said barbs or stops extending outwardly. By using two tubular members of differing hardness the thread of one acts as a set of flexible barbs.

A gasket, preferably of elastomeric material such as rubber, may be provided at the base of one of the tubular members, i.e. the member over which the other member is received. The gasket prevents leakage when the device is in use.

In a further alternative embodiment of the invention a third tubular member is fitted between the first and second members. The third member may be cylindrical and optionally slightly tapered at the ends thereof to facilitate fitting. Co-operating projections and grooves, apertures or the like may be provided on the first, second and third members to aid engagement between the first two members and the third member.

The tubular members in accordance with the invention may be made from an elastomer such as rubber or plastics.

The tubular member may comprise a deformable body which may be secured to the filter cloth by deforming said body. The body preferably comprises a metal such as brass or stainless steel. The body, which is preferably cone shaped, is operative to engage a third member which extends between the first two tubular members so as to act as a connecting piece.

In order that the present invention may be more readily understood specific embodiments thereof will now be described by way of example only with reference to the accompanying drawings in which:

FIG. 1 is a perspective view of one filter fabric apparatus in accordance with the invention;

FIG. 2 is a section through the filter apparatus of FIG. 1;

FIGS. 3 & 4 show a further filter apparatus in accordance with the invention;

FIG. 5 shows another filter apparatus in accordance with the invention;

FIG. 6 shows a further filter apparatus in accordance with invention;

Figure 7:
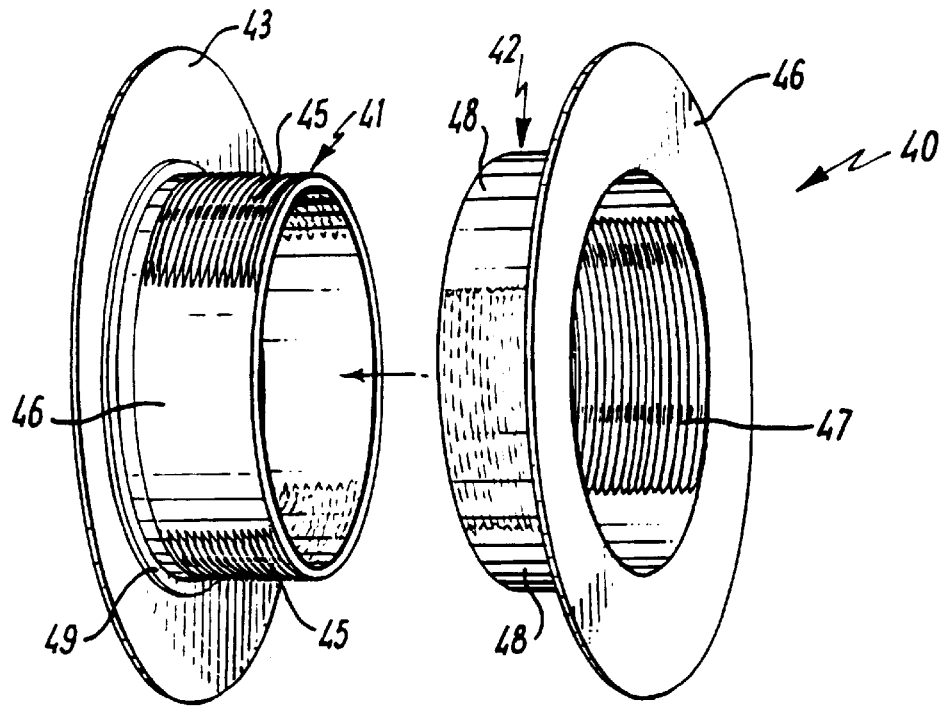
FIG. 7 is a perspective view of two tubular members of a further filter apparatus in accordance with the present invention.

Referring to FIGS. 1 and 2 a filter fabric apparatus 10 for use in a filter press comprises two truncated cones 11,12 moulded from plastics or from an elastomer. An annular flange 13,14 extends from one end of each cone, a filter cloth 15,16 being secured to each flange 13,14. An aperture is provided through each filter cloth the apertures being in register with the channels defined by the cones. The angle "α" of the truncated cones is very small, for example 2°.

In order to fit the filter apparatus 10 to a filter plate of a filter press the female truncated cone 12 is passed through the bore through the filter plate until the filter cloth 16 is located adjacent the filter plate. The male truncated cone 11 is then inserted from the opposite side of the filter plate into the female cone 12. The fit of the truncated cones is so precise that no fluid can escape between the touching surfaces when the filter plate is operating. It may be desirable when fitting the cones together to lubricate the engaging surfaces thereof.

FIGS. 3 and 4 show the assembly of a further embodiment of the invention 20. Here the first and second members have co-operating screw threads 21,22 on their engaging surfaces in order that the members may be brought into threaded engagement. Here the female member is inserted into the bore through the filter plate prior to the male member being brought into threaded engagement with it. This arrangement offers enhanced stability and strength.

FIGS. 5 and 6 show a further filter press apparatus 30 which comprises two flanged members 31,32 which both extend part way into the bore through the filter plate. A third tubular member 33 acts as a connecting piece joining the two members together. The third member 33 fits inside the first two members 31,32 with a snug fit.

The edges of the connecting piece may be tapered so as to facilitate easy fitting thereof. Co-operating projections and grooves may be provided on the first and second members and the third member, for example as shown in FIG. 6. Here annular projections 34 extend from the first and second members and engage with annular grooves 35 provided on the third member 33. Grooves may additionally or alternatively be provided on the first and second members for engagement with projections provided on the third member. The third member is preferably at least as rigid, if not more so, than the first and second members.

Figure 8:
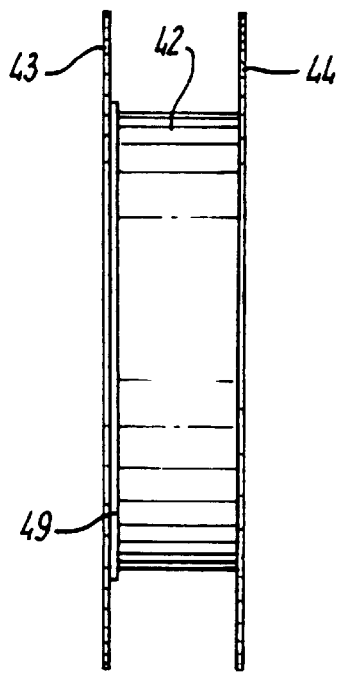
FIG. 8 is a side elevation of the members of FIG. 7.

Referring to FIGS. 7 and 8 a filter fabric apparatus 40 for use in a filter press comprises two tubes 41,42 moulded from plastics or an elastomer. Suitable materials include polypropylene, polyester and polyamide. An annular flange 43,44 extends from one end of each tube, a filter cloth (not shown) being secured to each flange. An aperture is provided through each filter cloth, the apertures being in register with the channels defined by the tubes.

The first tube 41 has annular grooves 45 provided around the outside thereof. A quarter of the grooves are removed so as to provide a blank portion 46. Similarly the opposing quarter of the grooves (not shown) is removed. Further annular grooves 47 are provided around the inside of the second tube. Once again opposing quarters 48 of the groove 47 are removed.

A rubber gasket 49 is provided on the flange 43 extending from the first tube 41.

In order to fit the filter apparatus to a filter plate the first tube 41 is passed through the hole through the filter plate until the filter cloth is located adjacent the filter plate. The other tube 42 is then inserted from the opposite side of the filter plate such that the grooved portions of one tube align with the grooved portions of the other tube. Further insertion is prevented once the end of the second tube abuts the gasket 49. The gasket 49 is held in place by the end of the second tube 42. The gasket 49 provides a good seal. Separation of the tubular members is effected by first twisting the members such that the grooved portions of one member are aligned with the non-grooved portions of the other. It is noted that the grooved portions need not be removed in quarters, but in thirds, fifths or any other suitable fraction.

Figure 9:
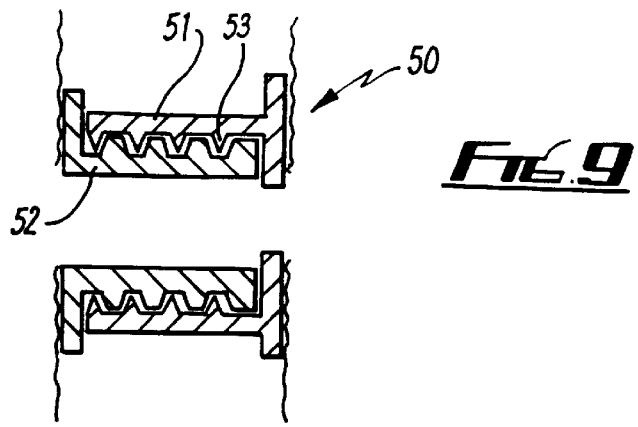
FIG. 9 shows a cross section through a further filter apparatus in accordance with the invention.

FIG. 9 shows a further filter apparatus 50 in which the first and second members 51,52 are made of materials of differing hardness. Co-operating screw threads 53 are provided on the two members 51,52. As the materials are of different hardness the thread 51 of the softer material acts as a set of flexible barbs.

Figure 10:
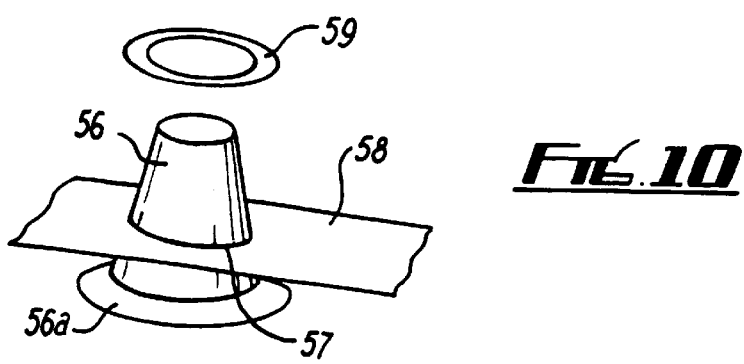
FIGS. 10 & 11 show a fixing member being secured to a filter cloth.
Figure 11:
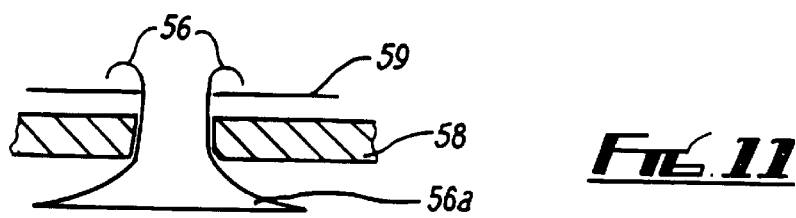
Figure 12:
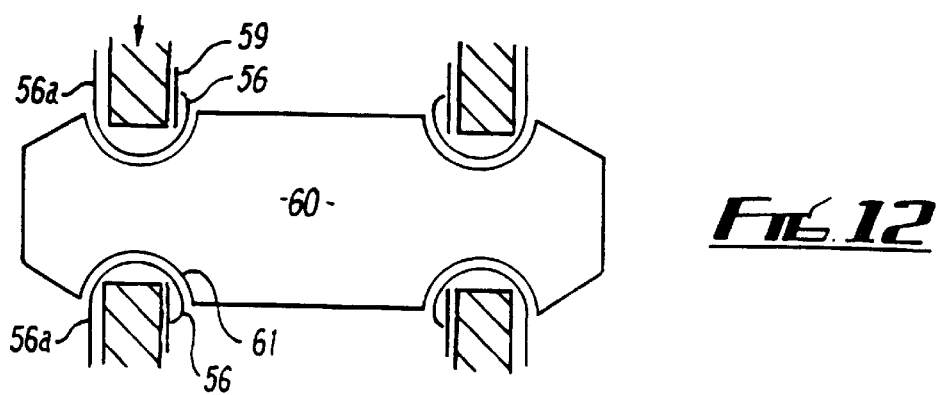
FIG. 12 shows filter cloths as shown in part in FIGS. 10 and 11 being secured to a connecting tubular member.

FIGS. 10 to 12 show a further arrangement. A metal, preferably brass or stainless steel hollow cone 56 having a flange 56a is passed through an aperture 57 in a filter cloth 58 until the cloth 58 abuts a part of the cone 56. A ring 59 of similar material is placed on the narrow end of the cone 56. A plunger is then inserted into the narrow neck of the cone 56 causing the metal to deform, thereby locking the ring 59 in place against the filter cloth 58. This is shown in FIG. 11.

The filter cloth is connected to one end of a tube 60 having narrowed end portions. The tube is made of elastomeric material. The end of the tube is passed through the aperture defined by the cone until the cone is received in an annular groove 61 in the tube 60 as illustrated in FIG. 12. The metal cone stiffens the filter cloth at the periphery of the inlet port. A similar cloth is attached to the other end of the tube 60 in a similar manner.

It is to be understood that the above described embodiments have been made by way of illustration only. Many modifications and variations are possible.

We claim:

1. A filter fabric apparatus for a filter press comprising first and second filter cloths each having respective first and second feed openings, the apparatus further comprising first and second tubular members each having opposed first and second free ends and through bores extending continuously from the first free end to the second free end of each of the first and second members, means for fixedly connecting the first free end of the first member to the first filter cloth with the respective cylindrical bore in coaxial alignment with the first feed opening, means for fixedly connecting the second free end of the second member to the second filter cloth with the respective cylindrical bore in coaxial alignment with the second feed opening, a third tubular member having opposed third and fourth free ends and a radially outer surface and a central bore defining a feed passage, said feed passage defining the passage through which material to be filtered is directed, wherein the radially outer surface of the third member is snugly received coaxially within the through bores of the first and second members, whereby said third member sealingly interconnects the first member to the second member.

2. The apparatus of claim 1 wherein the first free ends of said first and second members are flanged.

3. The apparatus of claim 1 wherein the third and fourth free ends of said third member are tapered.

4. The apparatus of claim 1 wherein the cylindrical bores of the first and second members each have a projection and the cylindrical outer surface of the third member has grooves which snugly receive respective ones of said projections for securely connecting said first and second members to said third member.

* * * * *